United States Patent
Ofuji et al.

(10) Patent No.: US 7,136,624 B2
(45) Date of Patent: Nov. 14, 2006

(54) RADIO RESOURCES ALLOCATING METHOD, RADIO RESOURCES ALLOCATING APPARATUS, AND MOBILE COMMUNICATION SYSTEM

(75) Inventors: Yoshiaki Ofuji, Yokosuka (JP); Sadayuki Abeta, Yokosuka (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 485 days.

(21) Appl. No.: 10/358,341

(22) Filed: Feb. 5, 2003

(65) Prior Publication Data
US 2003/0181163 A1 Sep. 25, 2003

(30) Foreign Application Priority Data
Feb. 6, 2002 (JP) ............................. 2002-030043

(51) Int. Cl.
*H04B 1/00* (2006.01)
(52) U.S. Cl. .................. 455/63.4; 455/450; 455/562.1; 370/902; 370/903; 370/905
(58) Field of Classification Search ................ 455/450, 455/456.1, 456.3, 561, 562.1, 63.4; 370/902, 370/903, 905; 342/378
See application file for complete search history.

(56) References Cited

U.S. PATENT DOCUMENTS

| 6,275,488 | B1 * | 8/2001 | Cudak et al. ................ 370/347 |
| 6,408,169 | B1 * | 6/2002 | Pallonen ................... 455/277.2 |
| 6,611,231 | B1 * | 8/2003 | Crilly et al. ................ 342/378 |
| 6,842,630 | B1 * | 1/2005 | Periyalwar ............... 455/562.1 |
| 2002/0002066 | A1 | 1/2002 | Pallonen |
| 2003/0078075 | A1 * | 4/2003 | McNicol ..................... 455/562 |

FOREIGN PATENT DOCUMENTS

| JP | 9-148981 | 6/1997 |
| JP | 2000-22618 | 1/2000 |
| JP | 2002-51375 | 2/2002 |
| WO | WO 97/46034 | 12/1997 |
| WO | WO 98/39945 | 9/1998 |
| WO | WO 00/11903 | 3/2000 |
| WO | WO 00/51367 | 8/2000 |
| WO | WO 01/74096 | 10/2001 |

\* cited by examiner

*Primary Examiner*—Matthew D. Anderson
*Assistant Examiner*—Sanh D. Phu
(74) *Attorney, Agent, or Firm*—Oblon, Spivak, McClelland, Maier & Neustadt, P.C.

(57) ABSTRACT

An object is to select destination mobile stations so as to prevent directional beams directed to the respective mobile stations from interfering with each other in application of a directional antenna, and to allocate the radio resources to the mobile stations thus selected. A base station 10, which is capable of forming a plurality of directional beams directed to a plurality of mobile stations by applying a directional antenna 11 capable of adaptively varying directivity, to a transmission-reception antenna, is provided with a location estimator 19 for estimating a location of each mobile station on the basis of orientation information of the directional antenna; a reception quality estimator 22 for estimating a reception quality of each mobile station; a transmission priority calculator 21 for calculating a transmission priority of a packet to be transmitted; a determiner 16 for determining the number and directions of directional beams to be formed, based on the reception quality of each mobile station, location of each mobile station, and transmission priorities of packets; and an allocation controller 13 for allocating the plurality of directional beams thus determined, to a plurality of mobile stations.

27 Claims, 7 Drawing Sheets

RADIO RESOURCES ALLOCATING METHOD, RADIO RESOURCES ALLOCATING APPARATUS, AND MOBILE COMMUNICATION SYSTEM

BACKGROUND OF THE INVENTION

1. Field of the Invention

The present invention relates to a radio resources allocating method, a radio resources allocating apparatus, and a mobile communication system and, more particularly, to a radio resources allocating method in which a base station capable of forming a plurality of directional beams by applying a directional antenna capable of adaptively varying directivity, to a reception-reception antenna, allocates radio resources to a plurality of mobile stations, a radio resources allocating apparatus for carrying out the method, and a mobile communication system comprising a base station with the radio resources allocating function.

2. Related Background Art

The conventional mobile communication systems used antennas to radiate omnidirectional beams, as transmission-reception antennas of base stations, and thus each base station performed scheduling of transmission and reception without the need for paying attention to detailed location information of a destination mobile station in a cell or in a sector as long as it was known that the destination mobile station existed in the cell or the sector.

On the other hand, when a directional antenna, e.g., an adaptive array antenna (Adaptive Array Antenna=AAA) is applied as a transmission-reception antenna of the base station, it becomes feasible to direct an antenna beam with sharp directivity to each mobile station existing in the cell or the sector. If interference power ratios between beams are small, i.e., if the beams are spatially separated from each other, with the directional beams being directed to the respective mobile stations, it becomes feasible to implement simultaneous transmission and reception of packet data to different mobile stations with the respective directional beams, without the application of code division multiplex or frequency division multiplex.

However, if a plurality of directional beams interfere with each other with the separate directional beams being directed to a plurality of mobile stations, there will arise the need for application of code division multiplex or frequency division multiplex or time division multiplex to the packet data. For this reason, in the field of the mobile communication systems adopting the directional antennas, there were demands for a technique of selecting destination mobile stations so as to prevent the directional beams directed to the respective mobile stations from interfering with each other, and allocating the radio resources to the mobile stations selected.

An object of the present invention is to provide a radio resources allocating method, a radio resources allocating apparatus, and a mobile communication system capable of selecting destination mobile stations so as to prevent directional beams directed to the respective mobile stations from interfering with each other in application of the directional antenna as described above, and allocating the radio resources to the mobile stations selected.

SUMMARY OF THE INVENTION

In order to accomplish the above object, a radio resources allocating method according to the present invention is a radio resources allocating method in which a base station capable of forming a plurality of directional beams by applying a directional antenna capable of adaptively varying directivity, to a transmission-reception antenna, allocates radio resources to a plurality of mobile stations, wherein the plurality of directional beams are allocated to the plurality of mobile stations, based on reception quality information of each mobile station, location information of each mobile station, and transmission priorities of packets to be transmitted.

The location information of each mobile station herein is assumed to include information about a direction of arrival of one radio wave or directions of arrival of plural radio waves out of radio waves arriving at the mobile station and information about a propagation distance of the radio wave or propagation distances of the radio waves, in addition to information about a relative location of the mobile station to the base station. It is also assumed that the radio resources include directional beams, and frequencies and codes as objects of multiplexing in data transmission. The directional antenna can be a smart antenna capable of adaptively varying directivity, e.g., an adaptive array antenna or the like.

Conventionally, the radio resources were allocated based on the reception quality information of each mobile station and the transmission priorities of packets, without paying attention to the locations of the respective mobile stations, whereas in the present invention a plurality of directional beams are allocated to a plurality of mobile stations, based on the three types of information including the location information of each mobile station: the reception quality information of each mobile station, the location information of each mobile station, and the transmission priorities of packets to be transmitted; therefore, the destination mobile stations can be selected so as to prevent the beams directed to the respective mobile stations from interfering with each other, and the radio resources are allocated to the mobile stations, whereby it is feasible to improve efficiency of use of the radio resources and to implement increase of throughput.

In the present invention, the method is characterized, so that, after the plurality of directional beams are allocated to the plurality of mobile stations, packet data is simultaneously transmitted to and received by the plurality of mobile stations. Namely, the data transmission to the plurality of mobile stations is concurrently carried out.

In the present invention, the method is characterized, so that on the occasion of allocating the radio resources used in transmission with the plurality of directional beams, the mobile stations allocated to the plurality of directional beams are selected, based on the reception quality information of each mobile station, the location information of each mobile station, and the transmission priorities of packets to be transmitted. Namely, in the present invention, when a plurality of directional beams are allocated so as to prevent the mutual interference and when a plurality of mobile stations exist in a direction of a certain beam, a mobile station allocated to the beam can be selected based on the reception quality information of each mobile station, the location information of each mobile station, and the transmission priorities of packets to be transmitted.

In the present invention, the reception quality information of each mobile station can be a ratio of carrier power to interference power (CIR), and a rate of interference power due to a transmitted signal from another base station in interference power. The interference power herein means a power of an interference signal and this interference signal is assumed to include noise as well. Particularly, by taking account of the rate of the interference power due to the transmitted signal from another base station in the interference power, it is feasible to estimate whether the other base station is performing communication with a directional beam being directed in the direction in which the mobile station exists. For this reason, it is desirable to avoid communication with any mobile station existing in the direction in which the other base station presumably directs its directional beam, in order to prevent interference with the communication of the other base station.

The above CIR may be replaced by a signal power to interference power ratio (SIR), i.e., a value of any signal power to interference power, or a signal power to noise power ratio (SN ratio or SNR).

The reception quality information of each mobile station can be a reception quality at the mobile station estimated in the case where communication with a directional beam is carried out, based on a reception quality at the mobile station for a predetermined reference signal transmitted from the base station.

Here predetermined reference signals (e.g., control signals such as pilot signals or the like) are usually transmitted with omni directional beams from the base station, and reception qualities in communication with such stationary beams are normally different from those in communication with directional beams. Therefore, when the reception qualities of signals transmitted with the omnidirectional beams such as the pilot signals from the base station are used as reception qualities of the respective mobile stations, it is necessary to convert them into reception qualities expected in the use of the directional beams. For execution of this conversion, it is necessary to give consideration to the fact that gains in the use of the directional beams are different among the mobile stations because of ① difference among spreads of incident angles of plural paths and ② control over transmission power according to the distance to each mobile station, depending upon the locational relation between each mobile station and the base station.

In the present invention, the location information of each mobile station can be information about a direction of arrival of a signal transmitted from the mobile station, or location information of the mobile station estimated from the direction of arrival. When the location of the mobile station is estimated at the base station, the location of the mobile station can be expressed by the direction and distance from the base station. A potential method of estimating the direction of the mobile station among them is a method of estimating the direction from phase differences of signals received by respective antenna elements constituting an array. Radio waves can arrive from different directions of plural paths because of reflection on ground and objects or the like, and in this case it is desirable to estimate a direction of arrival for each path. On the other hand, a potential method of estimating the distance of the mobile station is a method in which, where a signal transmission power of the mobile station is known by signaling or the like, the reception power from the mobile station is measured whereby the distance from the base station can be estimated to some extent.

The location information of each mobile station can be location information acquired based on measured location information notified of by the mobile station where the mobile station comprises location measuring means (e.g., GPS equipment or the like).

In the present invention, the transmission priority of a packet to be transmitted can be an index set based on a permissible delay determined by a required communication quality of the packet (so called QoS (Quality of Services)), the maximum number of retransmissions, a desired transmission speed, reception quality information of a destination mobile station, and a transmission waiting time at the base station. Consideration may also be given to whether a packet is one addressed to a mobile station having moved from another cell by handover.

Incidentally, in the present invention, a combination of mobile stations existing in directions of a plurality of directional beams preliminarily set on a stationary basis can be selected as the mobile stations subjected to simultaneous transmission and reception of packet data with the plurality of directional beams.

In this case, where a plurality of mobile stations exist in a direction of a certain directional beam, a mobile station corresponding to the directional beam can be selected, based on both or either of the reception quality information of each mobile station and the transmission priority of packet data to each mobile station. Namely, among the above plurality of mobile stations thus existing, the mobile station with the highest reception quality may be selected as the mobile station corresponding to the directional beam, or the mobile station with the highest transmission priority of packet data may be selected as the mobile station corresponding to the directional beam. The mobile station may also be selected on the basis of a comprehensive judgment on the both of the reception quality and the transmission priority of packet data.

In the present invention, a combination of mobile stations existing in directions in which a plurality of directional beams with a mutual interference power ratio therebetween being not more than a desired value can be formed, can be selected as the mobile stations subjected to simultaneous transmission and reception of packet data with the plurality of directional beams.

In this case, where there exist a plurality of combinations of the mobile stations that can be selection targets, the combination of mobile stations may be selected in favor of a combination of mobile stations providing the maximum number of mobile stations capable of undergoing simultaneous transmission; the combination of mobile stations may be selected in favor of a combination of mobile stations with which reception states of the mobile stations in the combination become comprehensively the best; the combination of mobile stations may be selected in favor of a combination of mobile stations with which transmission priorities for packet data to the mobile stations in the combination are comprehensively the highest. The combination of mobile stations may also be selected on the basis of comprehensive evaluation on a combination of two or more out of the above three ways.

Furthermore, in the present invention, the selection of the combination of mobile stations may be arranged to first select a single mobile station and then select as another mobile station, a mobile station existing in a direction of at least one directional beam that can be formed so that an interference power ratio with a directional beam directed to the single mobile station selected becomes not more than a preset value. Namely, the single mobile station is selected on the basis of the reception states of the respective mobile stations or the transmission priorities of packet data to be transmitted, and the mobile station existing in the direction of at least one directional beam that can be formed so that the interference power ratio with the directional beam directed to the single mobile station becomes not more than the preset value, is selected, as the mobile stations subjected to simultaneous transmission and reception of packet data with the plurality of directional beams.

Here, a mobile station in a best reception state can be selected as the single mobile station; or a mobile station with the highest transmission priority of packet data to be transmitted can be selected as the single mobile station.

In the present invention, there can occur a situation where a plurality of mobile stations exist in a certain direction out of directions of the directional beams formed. In this situation, the packet data to the plurality of mobile stations may be simultaneously transmitted by code division multiplex or frequency division multiplex, whereby the simultaneous transmission of packet data to the plurality of mobile stations existing in the same direction can be implemented by code division multiplex or frequency division multiplex.

There can also arise a situation where no combination of mobile stations exists in directions in which a plurality of directional beams with a mutual interference power ratio therebetween being not more than a desired value can be formed. In this situation, it is desirable to perform transmission and reception of packet data to the single mobile station with the single directional beam, or to perform transmission and reception of packet data to the plurality of mobile stations by code division multiplex or frequency division multiplex with a single directional beam or with a plurality of directional beams. Namely, the transmission and reception of packet data maybe performed to the single mobile station with the single directional beam, without performing the simultaneous transmission with the plurality of directional beams. The transmission and reception of packet data may also be carried out to the plurality of mobile stations by code division multiplex or frequency division multiplex of packet data, i.e., by code division multiplex or frequency division multiplex with a single directional beam or with a plurality of directional beams.

Incidentally, the radio resources allocating method according to the present invention can also be described as an aspect of the invention associated with the radio resources allocating apparatus and as an aspect of the invention associated with the mobile communication system.

Namely, a radio resources allocating apparatus according to the present invention is a radio resources allocating apparatus in a base station capable of forming a plurality of directional beams by applying a directional antenna capable of adaptively varying directivity, to a transmission-reception antenna, the radio resources allocating apparatus comprising: allocating means for allocating the plurality of directional beams to the plurality of mobile stations, based on reception quality information of each mobile station with which the base station is about to perform transmission and reception, location information of each mobile station, and transmission priorities of packets to be transmitted.

This allocating means is desirably configured to determine the number and directions of directional beams to be formed, based on the reception quality information of each mobile station, the location information of each mobile station, and the transmission priorities of packets to be transmitted.

The radio resources allocating apparatus is desirably configured to further comprise location estimating means for estimating a location of each mobile station, based on orientation information of the directional antenna; and location information storing means for storing the location information of each mobile station acquired by estimation.

The radio resources allocating apparatus is desirably configured to further comprise location information receiving means for receiving the location information of each mobile station notified of by each mobile station; and location information storing means for storing the location information of each mobile station acquired by reception.

The radio resources allocating apparatus is desirably configured to further comprise interference power ratio calculating means for calculating an interference power ratio of each beam with the other beams, where it is supposed that the base station forms a plurality of directional beams.

The radio resources allocating apparatus is desirably configured to further comprise quality information receiving means for receiving information about a reception quality at each mobile station for a reference signal from the base station, from each mobile station; quality estimating means for estimating a reception quality at each mobile station in the case where each mobile station is subjected to transmission and reception with a directional beam directed to the mobile station, based on the information about the reception quality at each mobile station obtained by reception; and quality information storing means for storing the reception quality information of each mobile station acquired by estimation.

The reception quality of each mobile station herein is desirably a power ratio of carrier power to interference power at each mobile station.

The radio resources allocating apparatus is desirably configured to further comprise transmission priority calculating means for calculating a transmission priority of each mobile station, based on at least one of the reception quality information of each mobile station, requirements from a communication quality of packet data to each mobile station, and a transmission waiting time of each packet data.

Namely, a mobile communication system according to the present invention is a mobile communication system comprising a base station capable of forming a plurality of directional beams by applying a directional antenna capable of adaptively varying directivity, to a transmission-reception antenna, and a plurality of mobile stations locating in a cell of the base station, wherein the base station comprises: allocating means for allocating the plurality of directional beams to the plurality of mobile stations, based on reception quality information of each mobile station with which the base station is about to perform transmission and reception, location in formation of each mobile station, and transmission priorities of packets to be transmitted.

This allocating means is desirably configured to determine the number and directions of directional beams to be formed, based on the reception quality information of each mobile station, the location information of each mobile station, and the transmission priorities of packets to be transmitted.

The mobile communication system according to the present invention is desirably configured so that the base station further comprises: location estimating means for estimating a location of each mobile station, based on orientation information of the directional antenna; and location information storing means for storing the location information of each mobile station acquired by estimation.

The mobile communication system according to the present invention is desirably configured so that at least one mobile station comprises: location measuring means for measuring a location of the mobile station; and location information notifying means for notifying the base station of the location information of the mobile station acquired by measurement; and so that the base station further comprises: location information receiving means for receiving the location information of the mobile station notified of by the mobile station; and location information storing means for storing the location information of the mobile station acquired by reception.

The mobile communication system according to the present invention is desirably configured so that the base station further comprises: interference power ratio calculating means for calculating an interference power ratio of each beam with the other beams, where it is supposed that the base station forms a plurality of directional beams.

The mobile communication system according to the present invention is desirably configured so that at least one mobile station comprises: quality calculating means for calculating a reception quality at the mobile station for a reference signal from the base station; and quality information notifying means for notifying the base station of information about the reception quality acquired by calculation; and so that the base station further comprises: quality information receiving means for receiving the information about the reception quality from the mobile station; quality estimating means for estimating a reception quality at the mobile station in the case where the mobile station is subjected to transmission and reception with a directional beam directed to the mobile station, based on the information about the reception quality at the mobile station acquired by reception; and quality information storing means for storing the reception quality information of the mobile station acquired by estimation.

The reception quality of the mobile station herein is desirably a power ratio of carrier power to interference power at the mobile station.

The mobile communication system according to the present invention is desirably configured so that the base station further comprises: transmission priority calculating means for calculating a transmission priority of each mobile station, based on at least one of the reception quality information of each mobile station, requirements from a communication quality of packet data to each mobile station, and a transmission waiting time of each packet data.

DESCRIPTION OF THE PREFERRED EMBODIMENTS

Embodiments of the present invention will be described below with reference to the drawings. The embodiments are directed toward fast packet transmission services of downlinks. It is also assumed that pilot signals are transmitted with omnidirectional beams.

[Configuration of Mobile Communication System]

Figure 1:
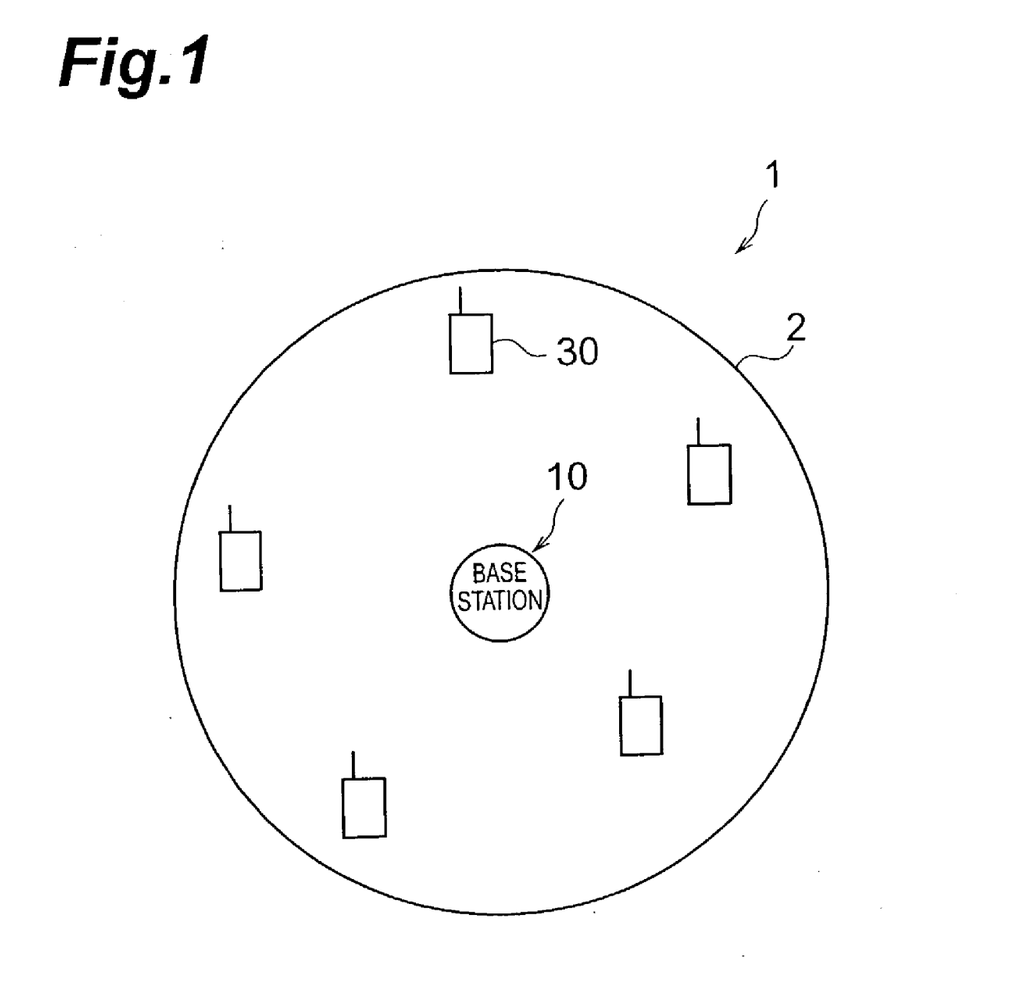
FIG. 1 is a configuration diagram of the mobile communication system according to an embodiment of the invention.

FIG. 1 shows the configuration of mobile communication system 1 of the present embodiment. As shown in this FIG. 1, the mobile communication system 1 comprises a base station 10, and a plurality of mobile stations 30 locating in a cell 2 of the base station 10.

Figure 2:
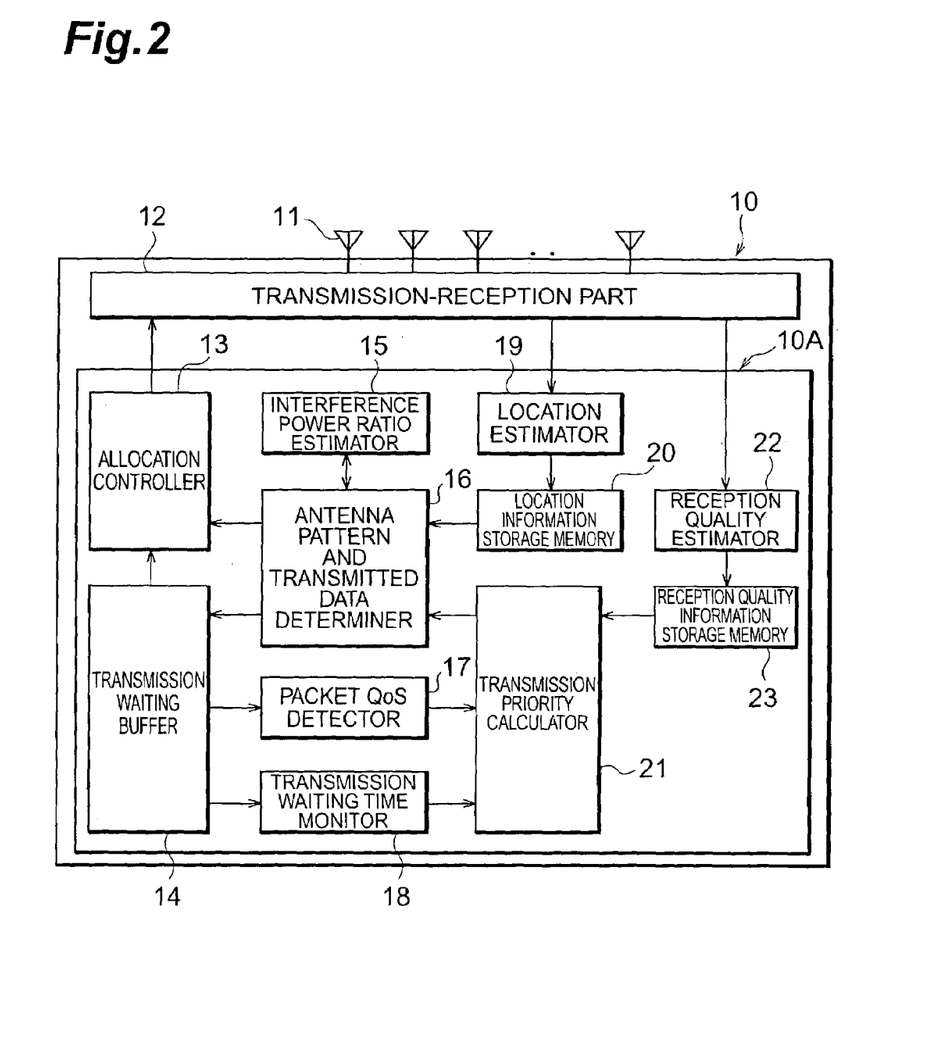
FIG. 2 is a configuration diagram of the base station.

FIG. 2 shows a device configuration example of the base station 10. As shown in FIG. 2, the base station 10 is comprised of adaptive array antennas (hereinafter referred to as "array antennas") 11 as a directional antenna capable of adaptively varying directivity, a transmission-reception part 12 for performing transmission and reception of packet data, and a radio resources allocating part 10A for performing radio resources allocating processing described later. The base station 10 is arranged to be able to form a plurality of directional beams by applying a plurality of array antennas 11 to a transmission-reception antenna. Any other smart antenna capable of adaptively varying directivity may also be adopted instead of the array antennas.

The radio resources allocating part 10A is comprised of a location estimator 19 for estimating the location of each mobile station 30 (FIG. 1) (including a direction of arrival of a radio wave or directions of arrival of radio waves out of those arriving at the mobile station 30, and a propagation distance of the radio wave or propagation distances of the radio waves, in addition to the relative location thereof to the base station 10); a location information storage memory 20 for storing the location information thus estimated; a reception quality estimator 22 for estimating a reception quality with a directional beam on the basis of a reception quality of a pilot signal notified of by each mobile station; a reception quality information storage memory 23 for storing the reception quality information thus estimated; a transmission priority calculator 21 for determining a transmission priority of each mobile station on the basis of the communication quality of packet data (QoS), a transmission waiting time of each data, and the reception quality information of each mobile station; an antenna pattern and transmitted data determiner 16 for evaluating the transmission priorities and location information of the respective mobile stations to determine the number and directions of directional beams, and packet data to be transmitted with each directional beam; an interference power ratio estimator 15 for estimating an interference power ratio between plural beams; a transmission waiting buffer 14 for temporarily saving packet data in a transmission waiting state; a packet QoS detector 17 for detecting the QoS information from the header of packet data in the transmission waiting buffer 14; a transmission waiting time monitoring part 18 for monitoring the transmission waiting time of each packet data (elapsed time since arrival at the transmission waiting buffer 14); and an allocation controller 13 for performing generation of antenna weights, addition of error-correction codes, modulation, etc. and also performing monitoring and control of operations of the respective parts in the radio resources allocating part 10A.

The transmission-reception part 12 performs processing including superposition of transmitted signals, separation of received signals, amplification of transmitted and received signals, and so on. The base station 10 is assumed to include all the components necessary for constitution of ordinary base station equipment, in addition to the components shown in FIG. 2.

Figure 3:
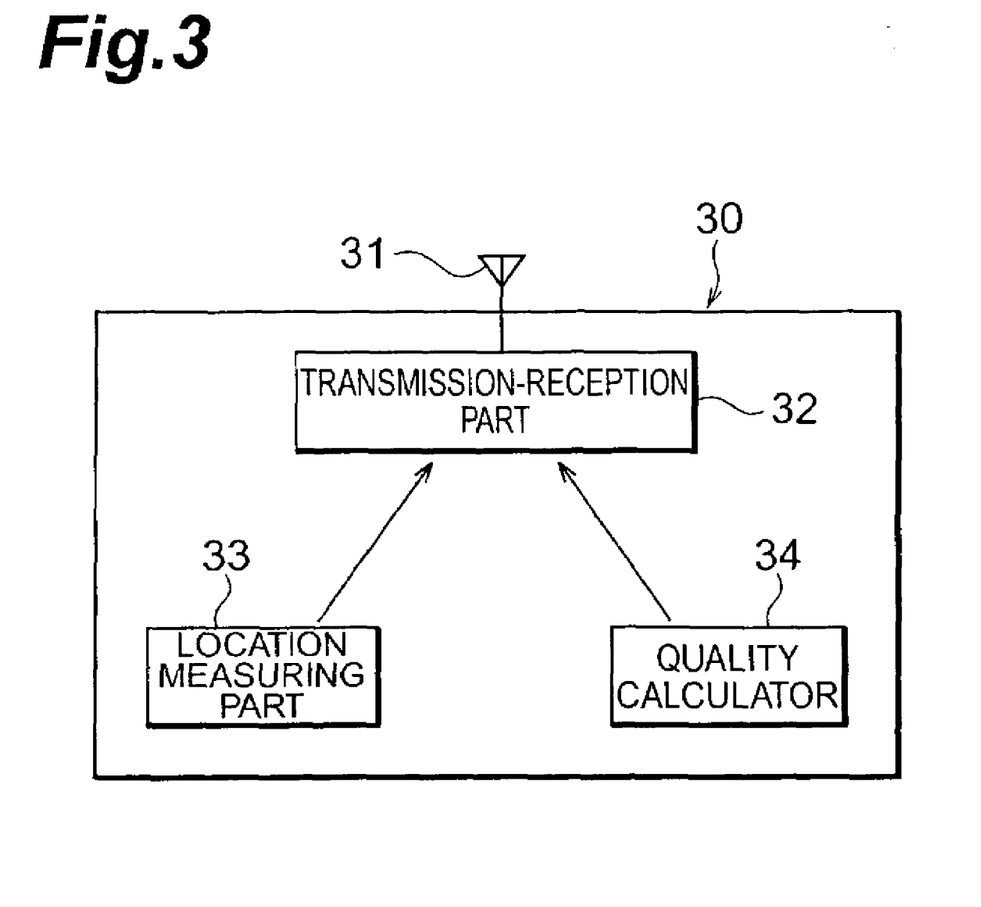
FIG. 3 is a diagram showing the components associated with the present invention in the mobile station.

FIG. 3 shows the components associated with the present invention in the mobile station 30. As shown in FIG. 3, the mobile station 30 is comprised of a location measuring part 33 incorporating GPS equipment and configured to measure the location of the mobile station 30; a quality calculator 34 for calculating a reception quality at the mobile station 30 of a pilot signal from the base station 10; and a transmission-reception part 32 equipped with an antenna 31 and configured to perform transmission and reception of packet data and send the location information of the mobile station 30 and the reception quality information of the reference signal to the base station 10.

[Radio Resources Allocating Processing]

Figure 4:
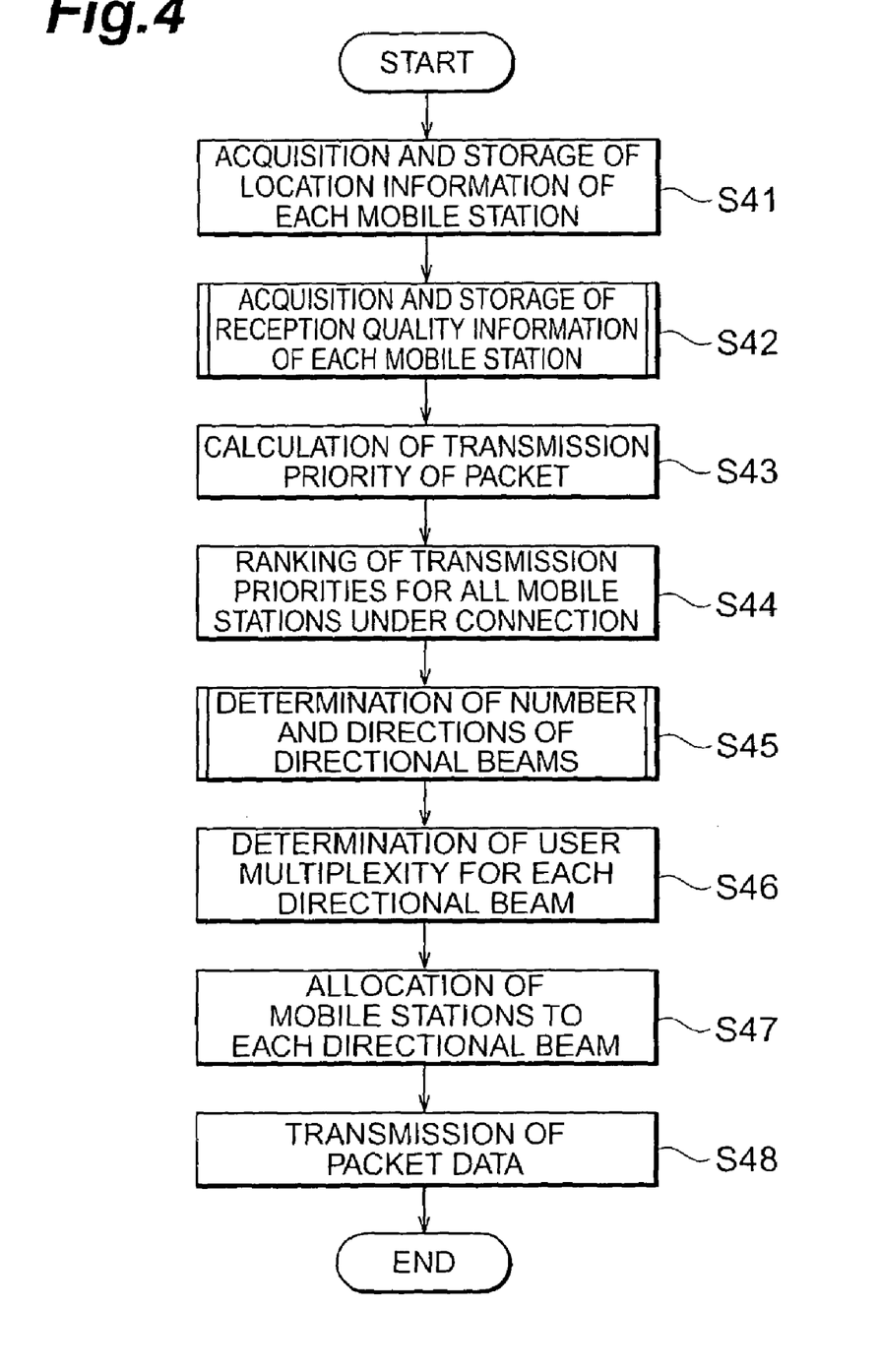
FIG. 4 is a flowchart of the radio resources allocating processing.

The following will describe the radio resources allocating processing in the base station 10, as the operation of the present embodiment. FIG. 4 shows a flowchart of the radio resources allocating processing.

In step S41 of FIG. 4, when receiving a communication start request from a mobile station 30, the base station 10 first preliminarily acquires the location information of the mobile station 30 and stores the location information in the location information storage memory 20.

If the mobile station 30 is equipped with the location measuring part 33 of FIG. 3, the mobile station 30 may notify the base station 10 of the location information acquired by measurement, as uplink control information. On the other hand, if the mobile station 30 is not equipped with the location measuring part 33, the location estimator 19 of the base station 10 may estimate the location information of the mobile station 30 from a direction of arrival and a reception power of a signal transmitted from the mobile station 30. The base station 10 is configured to update the location information of each mobile station 30 in an adequate period according to a moving speed of each mobile station 30 or the like.

Figure 5:
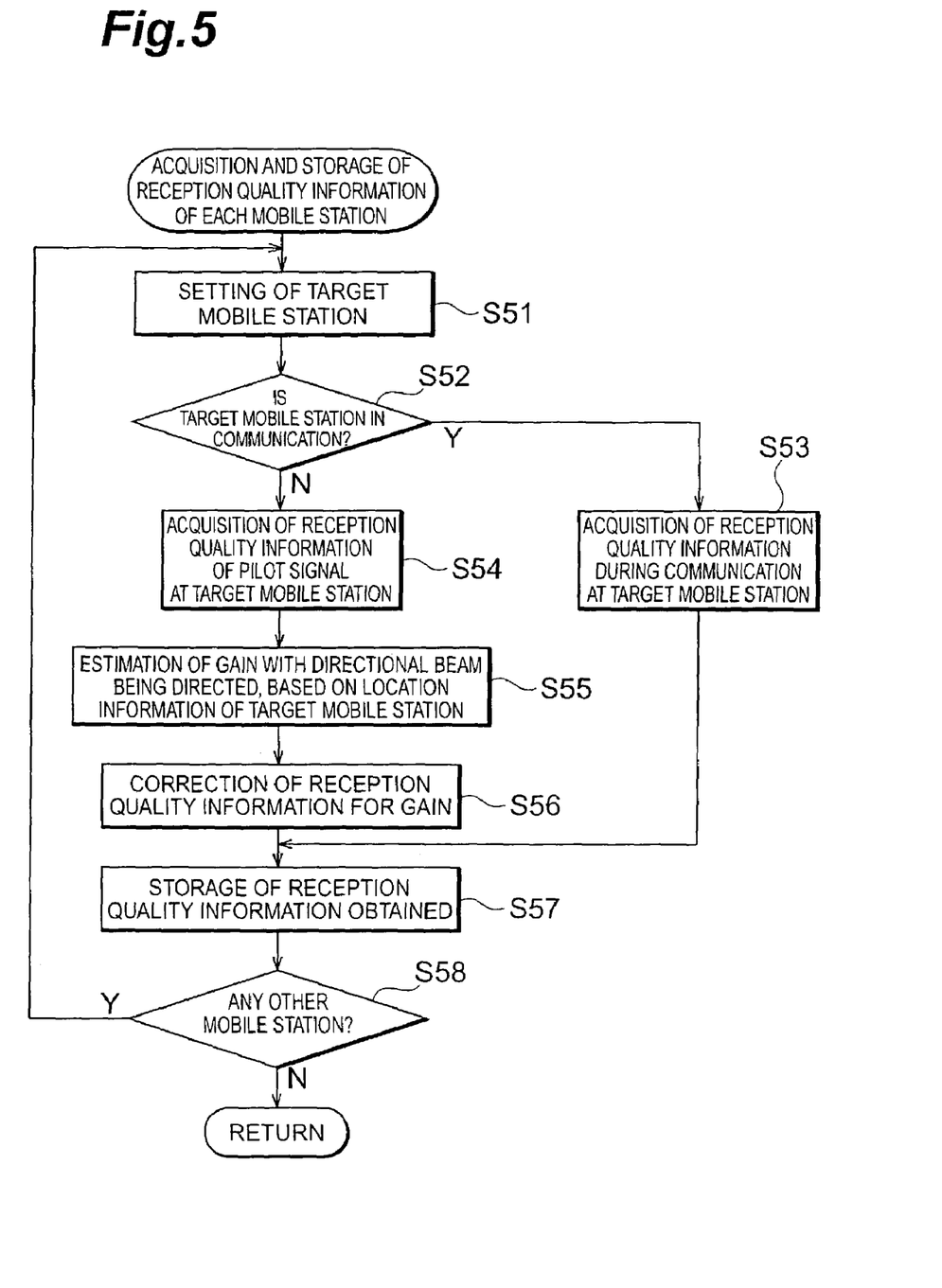
FIG. 5 is a flowchart of the subroutine about acquisition and storage of the reception quality information of each mobile station.

Next step S42 is to perform processing of acquiring and storing the reception quality information of each mobile station 30. In this processing, as shown in FIG. 5, one mobile station 30 as a target is first set out of mobile stations 30 as destinations of all packets (transmission waiting packets) in the transmission waiting state in the transmission waiting buffer 14 (S51), and it is determined whether the mobile station 30 of the target is in communication (S52). If the mobile station 30 of the target is in communication, the base station acquires the reception quality information during communication at the mobile station 30, e.g., a ratio of carrier power to interference power in a communicating channel (received CIR) (S53), and the reception quality information acquired is stored in the reception quality information storage memory 23 (S57). It is also possible to employ a signal power to interference power ratio (SIR), i.e., a value of any signal power to interference power, or a signal power to noise power ratio (SN ratio or SNR), instead of the above received CIR.

On the other hand, when the target mobile station 30 is not in communication, the base station acquires the reception quality information of the pilot signal at the mobile station 30, e.g., received CIR of a pilot channel (S54), and estimates a gain with a directional beam being directed to the mobile station, based on the location information of the mobile station 30 (S55). Then the reception quality information is corrected for the gain (S56), and the reception quality information after the correction is stored in the reception quality information storage memory 23 (S57).

The processing of S51 to S57 as described above is carried out for each mobile station 30 to acquire and store the reception quality information of each mobile station 30. When the processing is completed for all the mobile stations 30 as destinations of transmission waiting packets (in the case of a negative judgment in S58), the processing of FIG. 5 is terminated to return to step S43 of FIG. 4. Instead of the above, the base station may also be configured to determine the communication quality information on the basis of received CIR of the pilot signal, regardless of whether each mobile station is in communication.

Through the processing of FIG. 5, the mobile station 30 in communication decreases the received CIR, because a directional beam is directed to itself, while the mobile station 30 with no directional beam being directed thereto (not in communication) increases the received CIR; therefore, the processing is expected to present the effect of keeping down deviation of radio channel allocating opportunities among the mobile stations 30. In this case, however, the reception quality is not always good in practical communication even if the received CIR of the pilot signal is good. Therefore, the base station can be configured to estimate the interference with the directional beam of its own cell at each mobile station 30 from the shape of the current beam, the location information of each mobile station 30, etc. if possible, and subtract it to suppose and compare reception qualities in practical communication environments.

Returning to FIG. 4, next step S43 is a step in which the transmission priority calculator 21 calculates a transmission priority as an index indicating how to allocate the radio resources in favor of which mobile station 30, for each of the mobile stations 30 as destinations of the transmission waiting packets. In this step, the transmission priorities are comprehensively determined in consideration of requirements from QoS of the respective packets, the reception quality information of the destination mobile stations 30, and the transmission waiting times. Next step S44 is to perform sequencing (ranking) of the transmission priorities of all the mobile stations 30 under connection.

Figure 6:
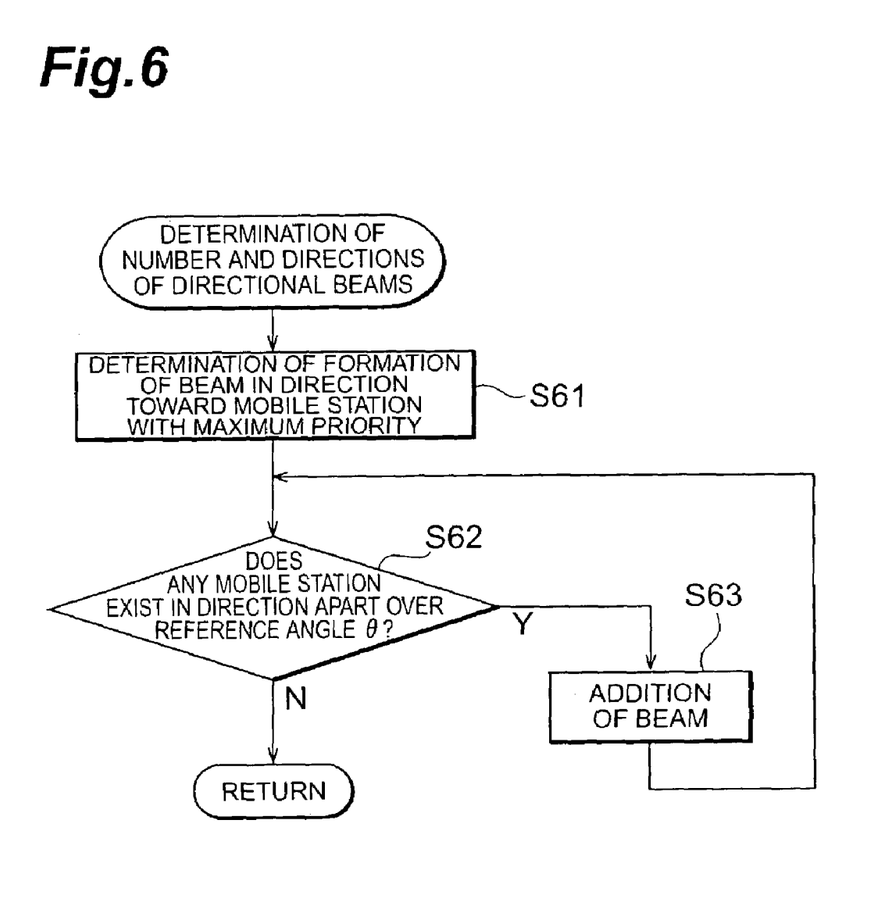
FIG. 6 is a flowchart of the subroutine about determination of the number and directions of directional beams.

In next step S45, the antenna pattern and transmitted data determiner executes processing of determining the number and directions of directional beams (FIG. 6). In this processing, the first step is to determine formation of a directional beam toward the mobile station 30 with the highest transmission priority according to the ranking obtained in S44 (S61). It is then determined whether, with this beam as a reference, there exists any mobile station 30 in a direction in which an interference power ratio with a new beam is within a range of not more than a desired value (for example, an angle from the direction of the reference beam is not less than a reference angle $\theta$ preliminarily determined by experiment or the like ($\theta$ is a minimum angle at which the mutual interference power becomes not more than a desired value) ) (S62). If there exists such mobile station 30, a directional beam is added toward the mobile station 30 whose direction difference from the reference beam becomes minimum (S63). Then the determination in S62 is again carried out using the newly added directional beam as a new reference, and the steps S62 and S63 are repeated. The judgment on whether it is possible to form a directional beam is made as follows: the interference power ratio estimator 15 estimates the interference power ratio of each beam on the assumption that the directional beam is formed, and it is determined that the beam can be formed when the resultant interference power ratio is lower than a desired value.

When S62 ends in determining that there exists no appropriate mobile station 30, i.e., determining that it is impossible to form a directional beam (in the case of a negative judgment in S62), the processing of FIG. 6 is terminated to return to step S46 of FIG. 4. At this stage, the number and directions of directional beams capable of keeping the mutual interference among the directional beams not more than the desired value have been determined.

Returning to FIG. 4, next step S46 is to determine a multiplexity of users in accordance with the number of mobile stations 30 existing in a specified direction, and the margins of the radio resources such as code resources, transmission power, frequencies, etc., for each of the directional beams thus determined, and step S47 is to allocate the mobile stations 30 to each directional beam, according to the user multiplexity for each directional beam. This permits implementation of simultaneous transmission of packet data to a plurality of mobile stations 3O by code division multiplex or frequency division multiplex of packet data to the plurality of mobile stations 30 even if the plurality of mobile stations 30 exist in a certain direction.

In the user allocation herein (i.e., the allocation of mobile stations 30 to each directional beam), where there exist a plurality of combinations of mobile stations 30 that can be selection targets, a combination of mobile stations 30 may be selected in favor of a combination of mobile stations 30 with which the number of mobile stations 30 capable of undergoing simultaneous transmission becomes maximum, or a combination of mobile stations 30 may be selected in favor of a combination of mobile stations 30 with which reception states of the mobile stations 30 in the combination become comprehensively the best. A combination of mobile stations 30 may also be selected in favor of a combination of mobile stations 30 with which transmission priorities for packet data to the mobile stations 30 in the combination become comprehensively the highest. Furthermore, a combination of mobile stations 30 may also be selected by combining two or more out of the above three ways and comprehensively evaluating the combinations.

After completion of the determination of all the number and directions of directional beams to be formed, and the mobile stations 30 to which packet data is to be transmitted with the respective directional beams (i.e., the packet data to be transmitted) as described above, S48 is carried out to perform generation of antenna weights, addition of error-correction codes, modulation, etc. and transmit the packet data.

The radio resources were allocated before on the basis of the reception quality information of each mobile station 30 and the transmission priorities of packets, without paying attention to the location of each mobile station 30, whereas the present invention employs the above radio resources allocating processing to allocate the plurality of directional beams to the plurality of mobile stations 30, based on the three types of information including the location information of each mobile station 30: the reception quality information of each mobile station 30, the location information of each mobile station 30, and the transmission priorities of the packets to be transmitted; therefore, the destination mobile stations 30 can be selected so as to prevent the beams directed to the respective mobile stations 30 from interfering with each other, and the radio resources are allocated to the mobile stations 30, whereby it is feasible to improve the efficiency of use of the radio resources and achieve the increase of throughput.

In the present embodiment, a combination of mobile stations 30 existing in directions of plural directional beams preliminarily set on a stationary basis maybe selected as the mobile stations 30 subjected to the simultaneous transmission and reception of packet data with the plurality of directional beams.

In this case, where a plurality of mobile stations 30 exist in a direction of a certain directional beam, a mobile station 30 corresponding to the directional beam can be selected, based on both or either of the reception quality information of each mobile station 30 and the transmission priority of packet data to each mobile station 30. Namely, among the plurality of mobile stations 30 thus existing, the mobile station 30 with the highest reception quality may be selected as the mobile station 30 corresponding to the directional beam, or the mobile station 30 with the highest transmission priority of packet data may be selected as the mobile station 30 corresponding to the directional beam. The mobile station 30 may also be selected based on a comprehensive judgment on the both of the reception quality and the transmission priority of packet data.

[Another Processing Example about Determination of Number and Directions of Directional Beams]

Figure 7:
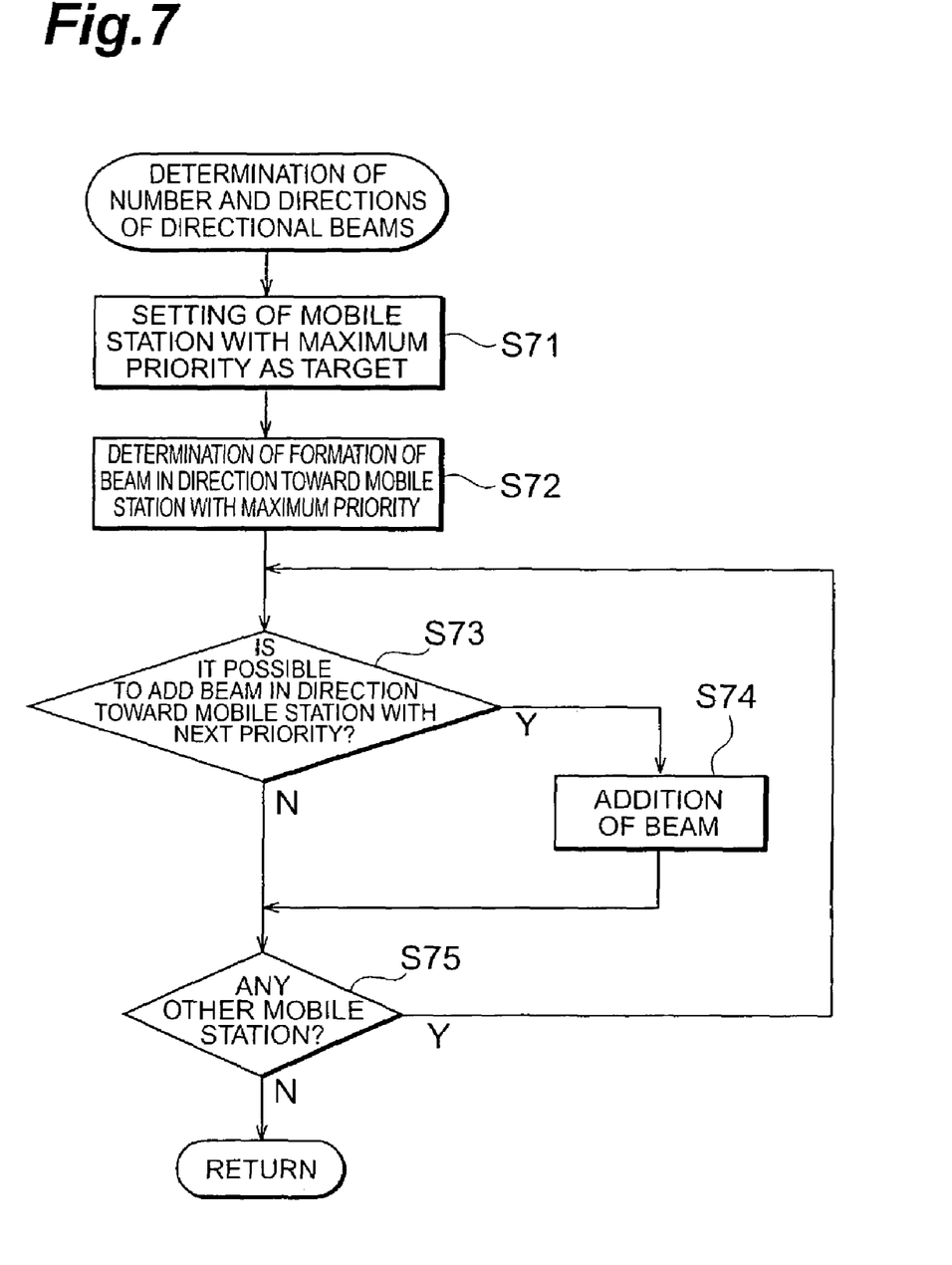
FIG. 7 is a flowchart of another subroutine about determination of the number and directions of directional beams.

Incidentally, the processing of determining the number and directions of directional beams and selecting the destination mobile stations 30 may be performed by the method of first determining the number and directions of directional beams and then selecting the destination mobile stations 30, as in above FIG. 6, but it may also be performed according to the procedure of first determining a single mobile station 30 and a directional beam toward the mobile station and then determining other directional beams and other mobile stations 30 on the basis of the first determined directional beam as a reference, as shown in FIG. 7.

This procedure will be described along FIG. 7. First, the mobile station 30 with the highest transmission priority is set as a target according to the ranking obtained in S44 of FIG. 4 (S71), and formation of one directional beam is determined in a direction toward the mobile station 30 (S72) It is noted that S71 is not limited to the use of the transmission priority as a reference, but the mobile station to be selected may be the mobile station 30 with the highest reception quality, or the mobile station 30 closest to the sector boundary.

It is then determined whether it is possible to add a new directional beam in a direction toward the mobile station 30 with the next highest priority under the condition that the interference between the directional beams is controlled at or below a desired value (S73). If it is possible, the directional beam is added in a direction toward the mobile station 30 (S74).

Thereafter, the processing of steps S73 and S74 is executed for each of the mobile stations in order from the mobile station 30 with the highest transmission priority. When the processing is completed for all the mobile stations 30 of targets (in the case of a negative judgment in S75), the processing of FIG. 7 is terminated.

This processing of FIG. 7 can also properly determine the number and directions of directional beams capable of keeping the interference between directional beams at or below the desired value. It is noted that the processing of steps S73 and S74 may also be executed in order from the mobile station 30 with the highest reception quality.

As described above, the present invention has successfully accomplished the following: while the radio resources were allocated before based on the reception quality information of each mobile station and the packet transmission priorities, without paying attention to the location of each mobile station, the present invention realized the allocation of the plurality of directional beams to the plurality of mobile stations, based on the three types of information including the location information of each mobile station: the reception quality information of each mobile station, the location information of each mobile station, and the transmission priorities of packets to be transmitted; therefore, the destination mobile stations can be selected so as to prevent the beams directed to the respective mobile stations from interfering with each other, and the radio resources are allocated to the mobile stations, whereby it is feasible to improve the efficiency of use of the radio resources and achieve the increase of throughput.

What is claimed is:

1. A radio resources allocating method in which a base station capable of forming a plurality of directional beams by applying a directional antenna capable of adaptively varying directivity, to a transmission-reception antenna, allocates radio resources to a plurality of mobile stations,
wherein the plurality of directional beams and their directions, with a mutual interference power ratio therebetween being not more than a desired value, are determined based on reception quality information of each mobile station, location information of each mobile station, and transmission priorities of packets to be transmitted, wherein
a multiplexity of users is determined in accordance with a number of mobile stations existing in a specified direction and margins of the radio resources for each of the directional beams, and the mobile stations are allocated to each of the directional beams in accordance with the determined multiplexity of users.

2. The radio resources allocating method according to claim 1, wherein, after the plurality of directional beams are allocated to the plurality of mobile stations, packet data is simultaneously transmitted to and received by the plurality of mobile stations.

3. The radio resources allocating method according to claim 2, wherein on the occasion of allocating the radio resources used in transmission with the plurality of directional beams, the mobile stations allocated to the plurality of directional beams are selected, based on the reception quality information of each mobile station, the location information of each mobile station, and the transmission priorities of packets to be transmitted.

4. The radio resources allocating method according to claim 1, wherein the reception quality information of each mobile station is a reception quality at the mobile station estimated in the case where communication with a directional beam is carried out, based on a reception quality at the mobile station for a predetermined reference signal transmitted from the base station.

5. The radio resources allocating method according to claim 1, wherein the location information of each mobile station is location information acquired based on measured location information notified of by the mobile station where the mobile station comprises location measuring means.

6. The radio resources allocating method according to claim 1, wherein the transmission priority of a packet to be transmitted is an index set based on a permissible delay determined by a required communication quality of the packet, the maximum number of retransmissions, a desired transmission speed, reception quality information of a destination mobile station, and a transmission waiting time at the base station.

7. The radio resources allocating method according to claim 3, wherein a combination of mobile stations existing in directions of a plurality of directional beams preliminarily set on a stationary basis is selected as the mobile stations subjected to simultaneous transmission and reception of packet data with the plurality of directional beams.

8. The radio resources allocating method according to claim 7, wherein, where a plurality of mobile stations exist in a direction of a certain directional beam, a mobile station corresponding to the directional beam is selected, based on both or either of the reception quality information of each mobile station and the transmission priority of packet data to each mobile station.

9. The radio resources allocating method according to claim 3, wherein a combination of mobile stations existing in directions in which a plurality of directional beams with a mutual interference power ratio therebetween being not more than a desired value can be formed, is selected as the mobile stations subjected to simultaneous transmission and reception of packet data with the plurality of directional beams.

10. The radio resources allocating method according to claim 9, wherein, where there exist a plurality of combinations of the mobile stations that can be selection targets, the combination of mobile stations is selected in favor of a combination of mobile stations providing the maximum number of mobile stations capable of undergoing simultaneous transmission.

11. The radio resources allocating method according to claim 9, wherein, where there exist a plurality of combinations of the mobile stations that can be selection targets, the combination of mobile stations is selected in favor of a combination of mobile stations with which reception states of the mobile stations in the combination become comprehensively the best.

12. The radio resources allocating method according to claim 9, wherein, where there exist a plurality of combinations of the mobile stations that can be selection targets, the combination of mobile stations is selected in favor of a combination of mobile stations with which transmission priorities for packet data to the mobile stations in the combination are comprehensively the highest.

13. The radio resources allocating method according to claim 3, wherein the mobile stations subjected to simultaneous transmission and reception of packet data with the plurality of directional beams are selected as follows:
a single mobile station is first selected based on reception states of the respective mobile stations or transmission priorities of packet data to be transmitted,
and then another mobile station is selected; the another mobile station exists in a direction of at least one directional beam that can be formed so that an interference power ratio with a directional beam directed to the single mobile station selected becomes not more than a preset value.

14. The radio resources allocating method according to claim 3, wherein, where there exist a plurality of mobile stations in a certain direction out of directions of the directional beams formed, packet data to the plurality of mobile stations is simultaneously transmitted by code division multiplex or frequency division multiplex.

15. The radio resources allocating method according to claim 3, wherein, where there exists no combination of mobile stations in directions in which a plurality of directional beams with a mutual interference power ratio therebetween being not more than a desired value can be formed, transmission and reception of packet data to a single mobile station is carried out with a single directional beam, or transmission and reception of packet data to a plurality of mobile stations is carried out by code division multiplex or frequency division multiplex with a single directional beam or with a plurality of directional beams.

16. A radio resources allocating apparatus in a base station capable of forming a plurality of directional beams by applying a directional antenna capable of adaptively varying directivity, to a transmission-reception antenna, the radio resources allocating apparatus comprising:
allocating means for allocating the plurality of directional beams and their directions, with a mutual interference power ratio therebetween being not more than a desired value, based on reception quality information of each mobile station location information of each mobile station, and transmission priorities of packets to be transmitted;

means for determining a multiplexity of users in accordance with a number of mobile stations existing in a specified direction and margins of the radio resources for each of the directional beams; and means for allocating the mobile stations to each of the directional beams in accordance with the determined multiplexity of users.

17. The radio resources allocating apparatus according to claim 16, further comprising:
location estimating means for estimating a location of each mobile station, based on orientation information of the directional antenna; and
location information storing means for storing the location infonnation of each mobile station acquired by estimation.

18. The radio resources allocating apparatus according to claim 16, further comprising:
location information receiving means for receiving the location information of each mobile station notified of by each mobile station; and
location information storing means for storing the location information of each mobile station acquired by reception.

19. The radio resources allocating apparatus according to claim 16, further comprising interference power ratio calculating means for calculating an interference power ratio of each beam with the other beams, where it is supposed that the base station forms a plurality of directional beams.

20. The radio resources allocating apparatus according to claim 16, further comprising:
quality information receiving means for receiving information about a reception quality at each mobile station for a reference signal from the base station, from each mobile station;
quality estimating means for estimating a reception quality at each mobile station in the case where each mobile station is subjected to transmission and reception with a directional beam directed to the mobile station, based on the information about the reception quality at each mobile station obtained by reception; and
quality information storing means for storing the reception quality information of each mobile station acquired by estimation.

21. The radio resources allocating apparatus according to claim 16, further comprising transmission priority calculating means for calculating a transmission priority of each mobile station, based on at least one of the reception quality information of each mobile station, requirements from a communication quality of packet data to each mobile station, and a transmission waiting time of each packet data.

22. A mobile communication system comprising a base station capable of forming a plurality of directional beams by applying a directional antenna capable of adaptively varying directivity, to a transmission-reception antenna, and a plurality of mobile stations locating in a cell of the base station, wherein the base station comprises:
allocating means for determining the plurality of directional beams and their directions, with a mutual interference power ration therebetween being not more than a desired value, based on reception quality information of each mobile station with which the base station is about to perform transmission and reception, location information of each mobile station, and transmission priorities of packets to be transmitted; and means for determining a multiplexity of users in accordance with a number of mobile stations existing in a specified direction and margins of the radio resources for each of the directional beams, and means for allocating the mobile stations to each of the directional beams in accordance with the determined multiplexity of users.

23. The mobile communication system according to claim 22, wherein the base station further comprises:
location estimating means for estimating a location of each mobile station, based on orientation information of the directional antenna; and
location information storing means for storing the location information of each mobile station acquired by estimation.

24. The mobile communication system according to claim 22, wherein at least one mobile station comprises:
location measuring means for measuring a location of the mobile station; and
location information notifying means for notifying the base station of the location information of the mobile station acquired by measurement; and
wherein the base station further comprises:
location information receiving means for receiving the location information of the mobile station notified of by the mobile station; and
location information storing means for storing the location information of the mobile station acquired by reception.

25. The mobile communication system according to claim 22, wherein the base station further comprises:
interference power ratio calculating means for calculating an interference power ratio of each beam with the other beams, where it is supposed that the base station forms a plurality of directional beams.

26. The mobile communication system according to claim 22, wherein at least one mobile station compnses:
quality calculating means for calculating a reception quality at the mobile station for a reference signal from the base station; and
quality information notifying means for notifying the base station of information about the reception quality acquired by calculation; and
wherein the base station further comprises:
quality information receiving means for receiving the information about the reception quality from the mobile station;
quality estimating means for estimating a reception quality at the mobile station in the case where the mobile station is subjected to transmission and reception with a directional beam directed to the mobile station, based on the information about the reception quality at the mobile station acquired by reception; and
quality information storing means for storing the reception quality information of the mobile station acquired by estimation.

27. The mobile communication system according to claim 22, wherein the base station further comprises:
transmission priority calculating means for calculating a transmission priority of each mobile station, based on at least one of the reception quality information of each mobile station, requirements from a communication quality of packet data to each mobile station, and a transmission waiting time of each packet data.

* * * * *